(12) United States Patent
Doria

(10) Patent No.: US 8,438,128 B2
(45) Date of Patent: May 7, 2013

(54) EMPIRICAL MODELING OF CONFUSION MATRICES

(75) Inventor: David M. Doria, Lakewood, CA (US)

(73) Assignee: Raytheon Company, Waltham, MA (US)

( * ) Notice: Subject to any disclaimer, the term of this patent is extended or adjusted under 35 U.S.C. 154(b) by 866 days.

(21) Appl. No.: 12/604,539

(22) Filed: Oct. 23, 2009

(65) Prior Publication Data

US 2010/0106676 A1    Apr. 29, 2010

Related U.S. Application Data

(60) Provisional application No. 61/108,711, filed on Oct. 27, 2008.

(51) Int. Cl.
*G06F 9/44* (2006.01)
*G06N 7/02* (2006.01)
*G06N 7/06* (2006.01)

(52) U.S. Cl.
USPC ............................................................ 706/52

(58) Field of Classification Search ............ 706/52
See application file for complete search history.

(56) References Cited

U.S. PATENT DOCUMENTS

| | | | |
|---|---|---|---|
| 7,421,348 B2 * | 9/2008 | Swanson .......................... 702/32 |
| 7,761,238 B2 * | 7/2010 | Moser et al. ..................... 702/19 |
| 8,055,451 B2 * | 11/2011 | Owczarzy et al. .............. 702/19 |
| 8,214,181 B2 * | 7/2012 | Swanson ........................... 703/2 |

OTHER PUBLICATIONS

Confuser rejection modeling, Doria, D.M. Signals, Systems and Computers, 2008 42nd Asilomar Conference on Topic(s): Computing & Processing (Hardware/Software); Signal Processing & Analysis Digital Object Identifier: 10.1109/ACSSC.2008.5074698 Publication Year: 2008 , pp. 1624-1627.*
Enhanced SVM versus Several Approaches in SAR Target Recognition, El-Dawlatly, S.; Osman, H.; Shahein, H.I., Computer Engineering and Systems, The 2006 International Conference on Topic(s): Communication, Networking & Broadcasting ; Computing & Processing (Hardware/Software) Digital Object Identifier: 10.1109/IC-CES.2006.320459, pp. 266-270.*
Helstrom, C. W., "Elements of Signal Detection Estimation," PTR Prentice Hall, Englewood Cliffs, NJ (1995).
McDonough, R. N. & Whalen, A. D., "Detection of Signals in Noise," Academic Press, Ch. 7, pp. 247-285, 2d ed. (1995).
Oliver, C. & Quegan, S., "Understanding Synthetic Aperture Radar Images," Artech House (1998).
Zhao, Q. & Principe, J. C., "Support Vector Machines for SAR Automatic Target Recognition," IEE Transactions on Aerospace and Electronic Sys., vol. 37, No. 2, pp. 643-654, Table IV, Template Matching Confusion Matrix (Apr. 2001).

* cited by examiner

*Primary Examiner* — Michael B Holmes
(74) *Attorney, Agent, or Firm* — Schwegman Lundberg & Woessner, P.A.

(57) ABSTRACT

A method and system of estimating the performance of a classifier system based on a reported confusion matrix includes, in one embodiment, parameters fit to observed confusion matrices, such that the expected performance of decision detection versus the probability of not-in-library reports can be estimated based on the forced decision confusion matrix. The approach also lends itself to a general methodology for modeling classes of confusers in a statistical manner, which can be extended to modeling clutter severity.

12 Claims, 6 Drawing Sheets

EMPIRICAL MODELING OF CONFUSION MATRICES

CROSS REFERENCE TO RELATED APPLICATIONS

This application claims benefit under 35 U.S.C. §119(e) of U.S. provisional patent application Ser. No. 61/108,711, filed on Oct. 27, 2008, the entire contents of which are incorporated herein by reference.

BACKGROUND

This application generally relates to artificial intelligence and/or pattern recognition systems, and in particular, estimating the performance of a classifier system.

Classifier systems may be used in the field of artificial intelligence and/or pattern recognition to identify an object and then to classify it into one or more predetermined categories. One exemplary classifier system is an automated target recognition (ATR) system. For example, ATR systems are known which are used to identify and categorize military targets. Classifier systems may also be used for face recognition, agriculture classification, medical applications (e.g., detecting healthy and unhealthy tissue or cells), and many other applications.

A confusion matrix is a tool that may be used to characterize the performance of a given classifier system. Typically, the confusion matrix is generated by evaluating the response of a classifier system to known data.

However, there is no effective way to estimate the performance of classifier systems when presented with unknown data.

SUMMARY

According to an aspect of this disclosure, a computer-implemented method for estimating the performance of a classifier system, is provided comprising: providing an observed confusion matrix quantified by in-library category data which characterizes the classifier system as an input to a computer; generating, using the computer, an empirical model for the performance of the confusion matrix using two density functions that capture correct and incorrect performance of the in-library categories and their respective parameters, and a further density function characterizing an in-library to out-of-library probability parameter; predicting, based upon the empirical model, how well the classifier system will perform when presented with out-of-library data; and outputting, from the computer, the prediction to estimate the performance of the classifier system.

According to another aspect of this disclosure, a system for estimating the performance of a classifier system, is provided comprising: a computer processor; a memory containing a structured database having an observed confusion matrix quantified by in-library category data which characterizes the classifier system; an empirical modeler configured to generate an empirical model of the classifier performance using two density functions that capture correct and incorrect performance of the in-library categories and their respective parameters from the confusion matrix, and a further density function characterizing an in-library to out-of-library probability parameter; a predictions unit configured to predict, based upon the empirical model, how well the classifier system will perform when presented with out-of-library data; and a device configured to output the prediction to estimate the performance of the classifier system.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

A methodology of estimating the parameters of an empirical model of classifier performance that can then be used to model the performance of a classifier system based on an observed reported confusion matrix is provided. In one embodiment, parameters are fit to the observed confusion matrix, such that the expected performance of decision detection versus the probability of not-in-library reports can be estimated based on the forced decision confusion matrix. This approach also lends itself to a general methodology for modeling classes of confusers in a statistical manner, and can in principle, also be extended to modeling clutter severity. The expected performance of the system in the case of "not-in-library" target types is also discussed.

According to one aspect of this disclosure, the performance of a pattern classification system may be estimated, without explicit detailed knowledge of the design of the classification system. The benefits of such an approach may be applied to many diverse areas that involve pattern recognition problems.

Figure 1:
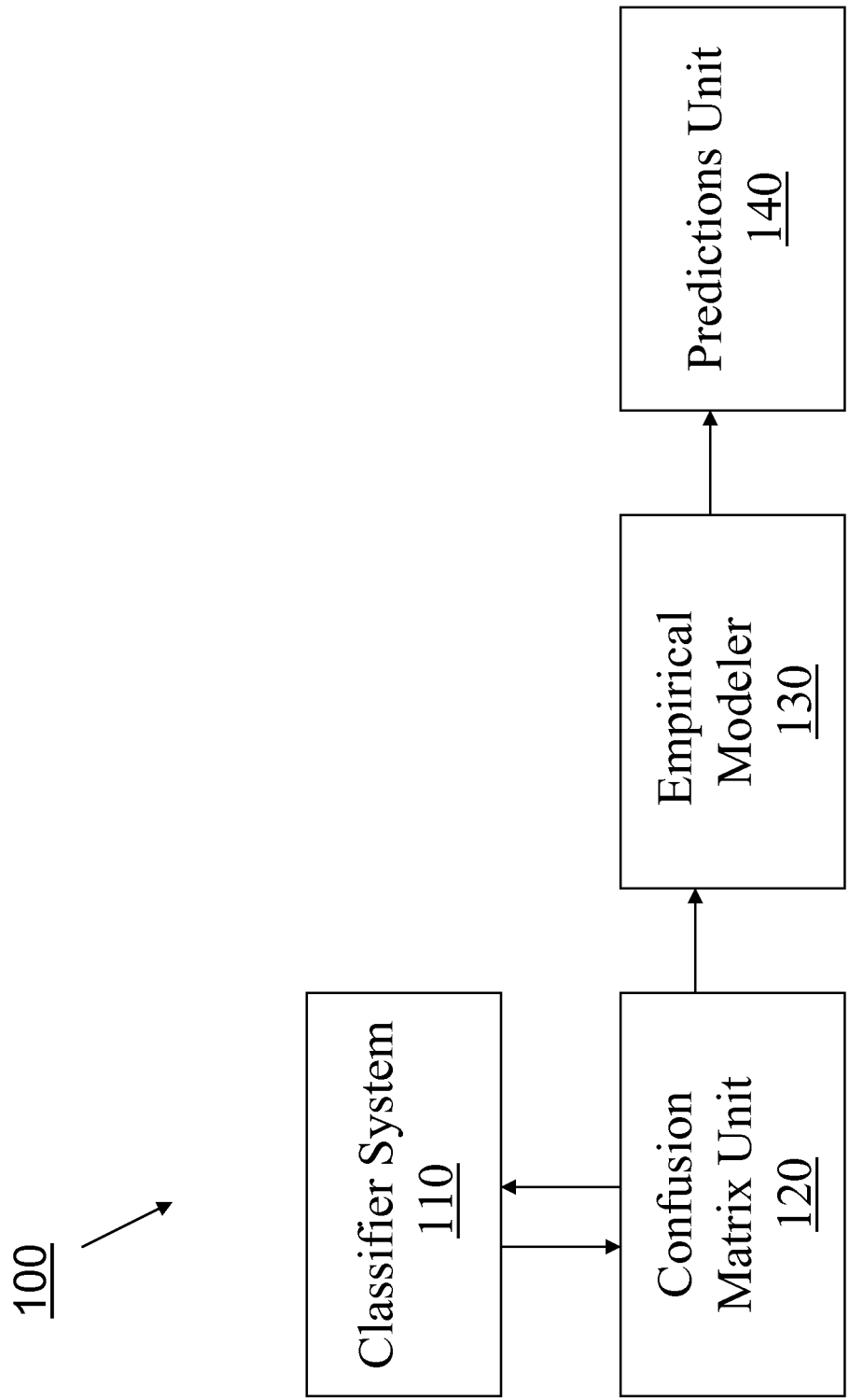
FIG. 1 shows an exemplary system for estimating the performance of a classifier system, according to an embodiment of this disclosure.

FIG. 1 shows an exemplary system 100 for estimating the performance of a classifier system, according to an embodiment of this disclosure.

The system 100 may be implemented in software, hardware, or combinations thereof. For example, the system 100 may executed using one or more computers or other machines.

The system 100 generally includes a classifier system 110, confusion matrix unit 120, empirical modeler 130 and a predictions unit 140. It will be appreciated that some elements may be combined, and that additional elements are possible.

The classifier system 110 may include any classifier system. Exemplary classifier systems are generally used with artificial intelligence and/or pattern recognition systems. In one embodiment, the classifier system 110 may be automated target recognition (ATR) system. For example, ATR systems are known which identify critical military targets using synthetic aperture radar (SAR) imagery. In other implementations, the classifier system 110 may be applied to target recognition, face recognition, agriculture classifications, medical applications (e.g., detecting healthy and unhealthy tissue or cells).

The confusion matrix unit 120 may be used for estimating the performance of a classifier system. A confusion matrix shows how well the classifier system confusing two (or more) classes based on known category data. The confusion matrix contains information about actual (or "true class type") and predicted classification performance (i.e., correct or incorrect classification) of known category data by a classification system. The columns of the matrix, for example, may represent instances of the known data in a predicted class. The rows of the matrix may represent instances of the known data in an actual class. Confusion matrices may be generated by known hardware, software (firmware), or combinations thereof, in conjunction with a classifier system 110. In one implementation, the confusion matrix unit 120 may interact and exchange data with the classifier system 110. For example, in one embodiment, the confusion matrix unit 120 may include a memory containing a structured database having an observed confusion matrix quantified by in-library category data which characterizes the classifier system.

As used herein, the known data to the classifier system may be referred to as "in-library" category data. "In-library" category data may include, for example, digital files or other data which may be introduced to the classified system. In one implementation, the category data may include digital photograph or video signals typical of which a camera or sensor would feed to a microprocessor for identification and classification. For example, the "in-library" category data may be stored in a memory associated with the confusion matrix unit 120. Conversely, data which is unknown to the classifier system may be referred to as "out-of-library" category data. In some implementations, this may be actual data measurements which the classifier system 110 may be used to classify.

The empirical model generator 130 may be configured to model the confusion matrix performance when presented with data from out-of-library categories.

In one embodiment, the empirical model relies upon two density functions that capture correct and incorrect performance of the in-library categories and their respective parameters, and a further density function characterizing an in-library to out-of-library probability parameter.

In one implementation, the two density functions may be Gaussian-derived functions, for example, a Rayleigh density function and a Ricean density function. The further density function may include the non-centrality term of a Rayleigh density function.

The predictor unit 140 is configured to output how well the classifier system will perform when presented with data from out-of-library categories.

In some implementations, the display may be a visual display device (for example, a monitor) and/or a print-out. Alternatively or additionally, the data may be stored, for example, on a computer or machine memory (e.g., flash memory, CD/DVD-ROM, hard-drive, etc.) for later retrieval and analysis.

Figure 4:
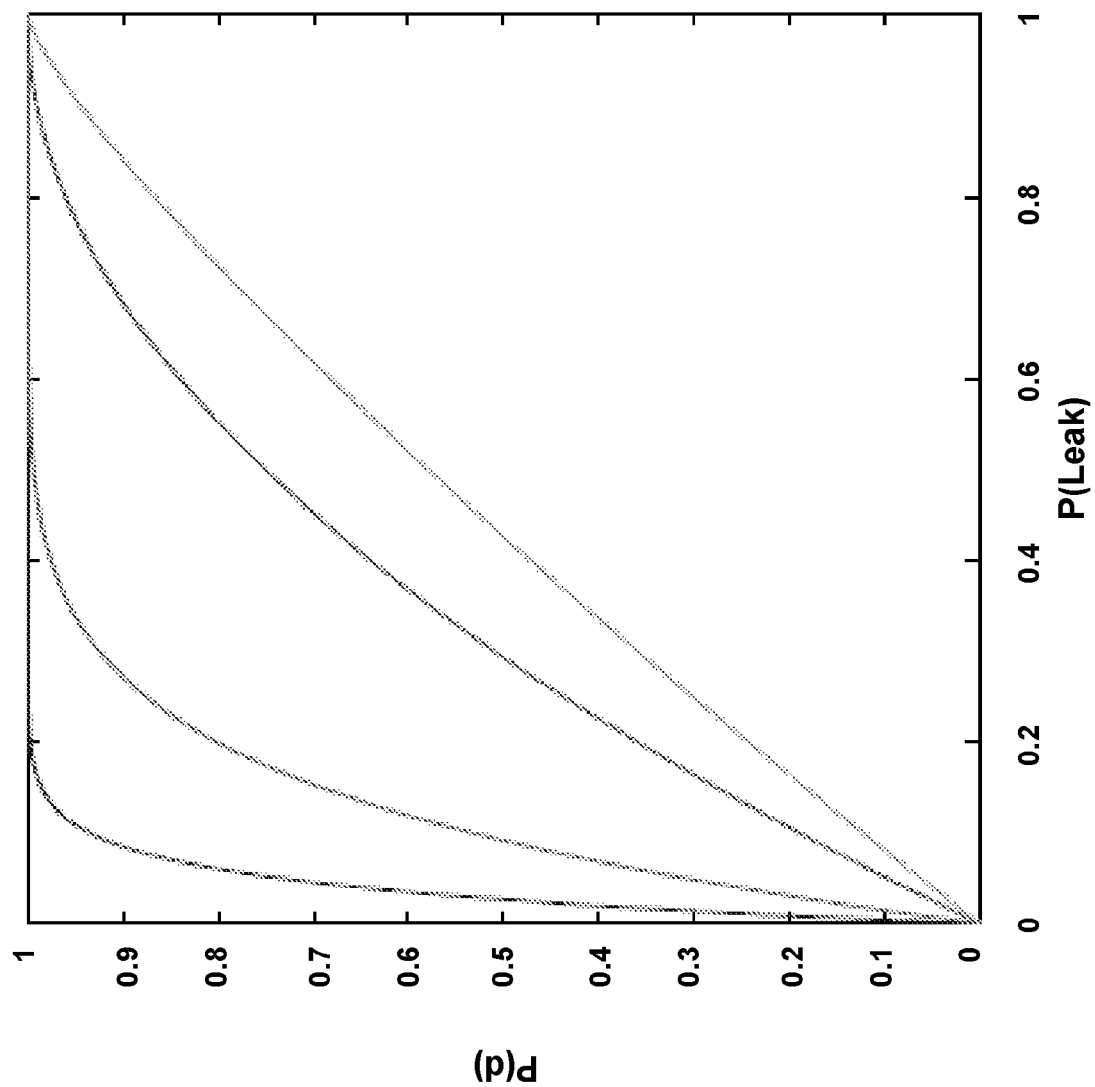
FIG. 4 shows plots of the correct detection versus probability not in-library for four different values of density parameter at a fixed distribution and number of true classes.
Figure 5:
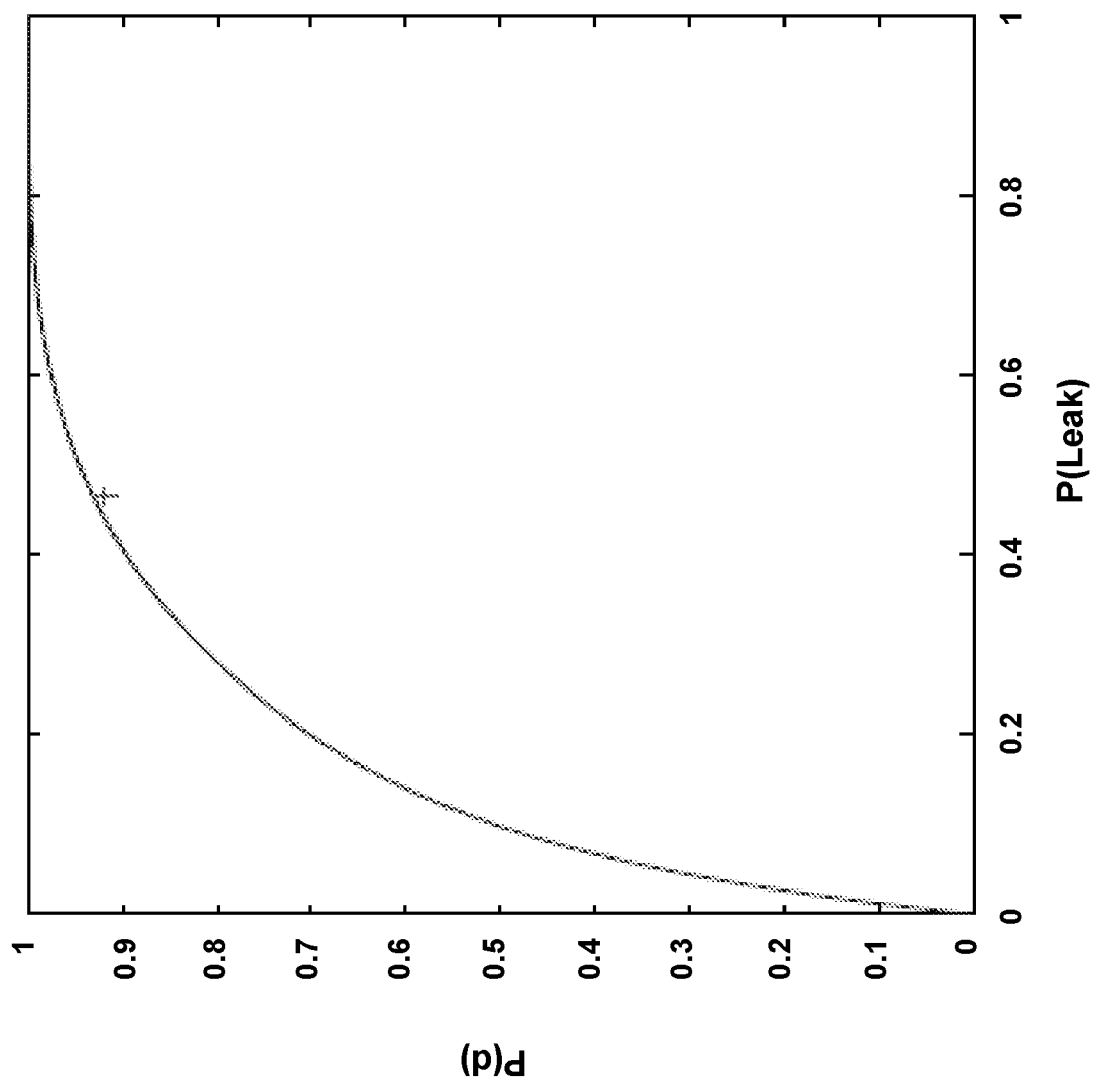
FIG. 5 shows an example of joint identification and correct detection and conditional identification given correct detection versus probability of non-in-library.
Figure 6:
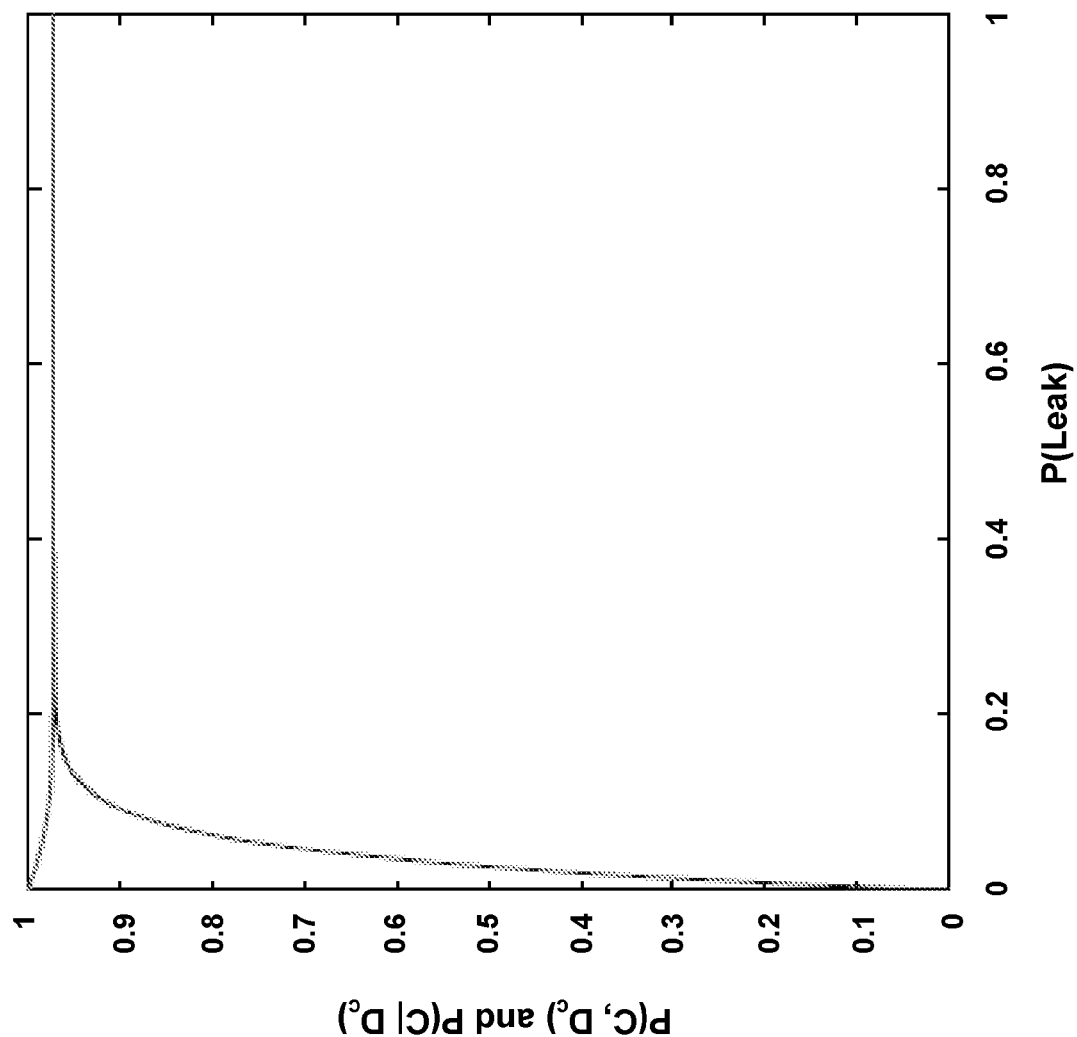
FIG. 6 shows the resulting averaged correct detection, which was obtained by averaging the respective correct detection values from the rows of the reported confusion matrix versus probability of not-in-library, along with the reported probability of not-in-library at the measured correct detection value.

As shown in FIGS. 4-6, the predictions, based upon the empirical model, may be displayed as a plot of the probability of detection ($P_D$) vs. probability that the category data is not-in-library ($P_{leak}$).

Figure 2:
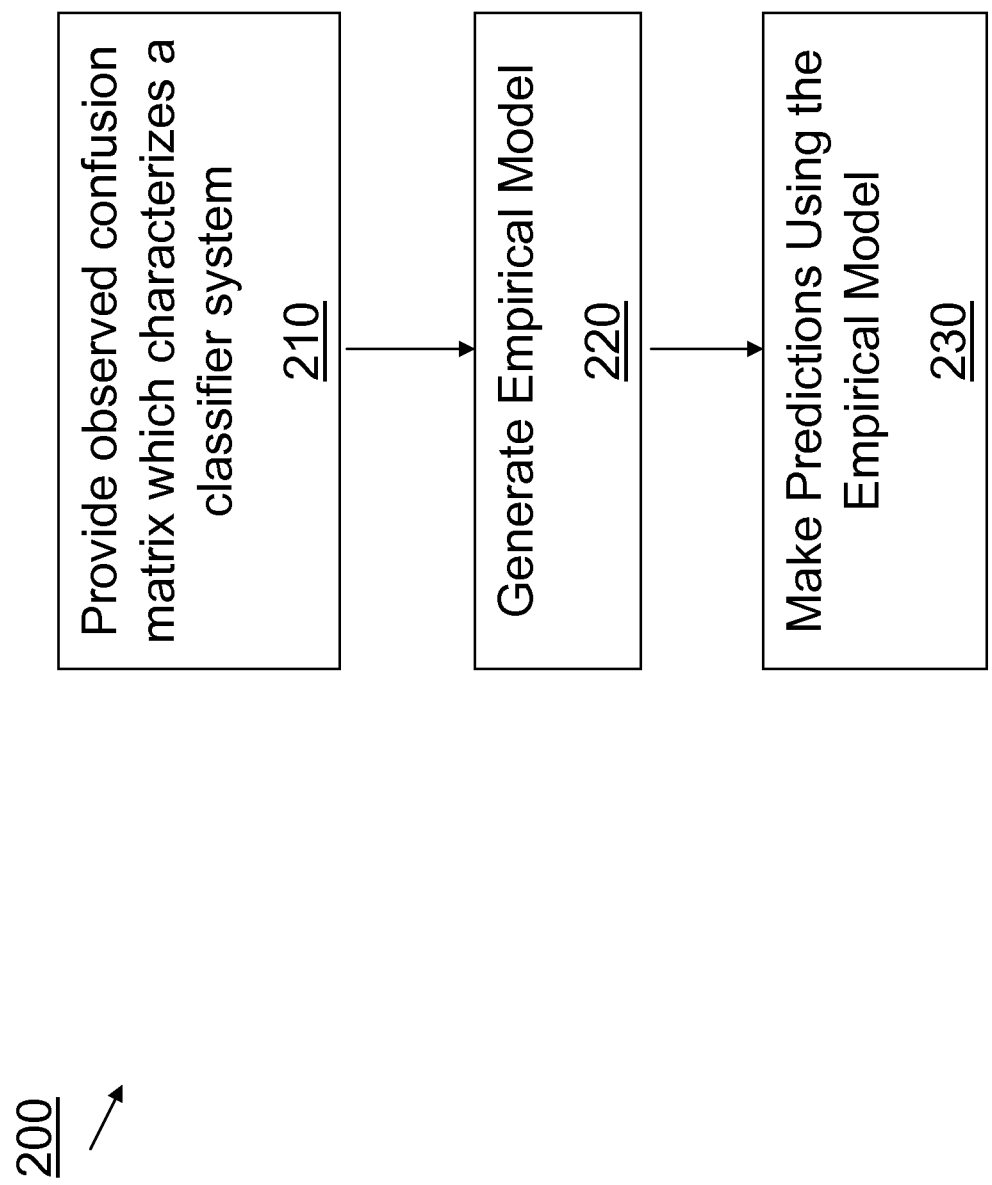
FIG. 2 shows an exemplary method for estimating the performance of a classifier system, according to an embodiment of this disclosure.

FIG. 2 shows an exemplary method 200 for estimating the performance of a classifier system, according to an embodiment of this disclosure.

Beginning in step 210, an observed confusion matrix quantified by in-library category data which characterizes the classifier system is provided. As discussed above, the empirical model lends itself to the confusion matrix irrespective of the classifier system.

Next, in step 220, an empirical model is generated for evaluating the performance of the confusion matrix using two density functions that capture correct and incorrect performance of the in-library categories and their respective parameters, and a further density function characterizing an in-library to out-of-library probability ratio. In some implementations, the same empirical model may be used for different classifier systems, but having different parameters. As such, the empirical model may be stored in a memory.

In step 230, using the empirical model, predictions may be made as to how well the classifier system will perform when presented with out-of-library data. The predictions may be output to a user for analysis. For example, the output data may be stored in a memory, displayed on a monitor, and/or printed.

Empirical Model and Predictions

As discussed above, according to an aspect of this disclosure, an empirical model is implemented for predicting the probability of reporting or detecting a not-in-library object given that one has an observed confusion matrix of the in-library objects.

Figure 3:
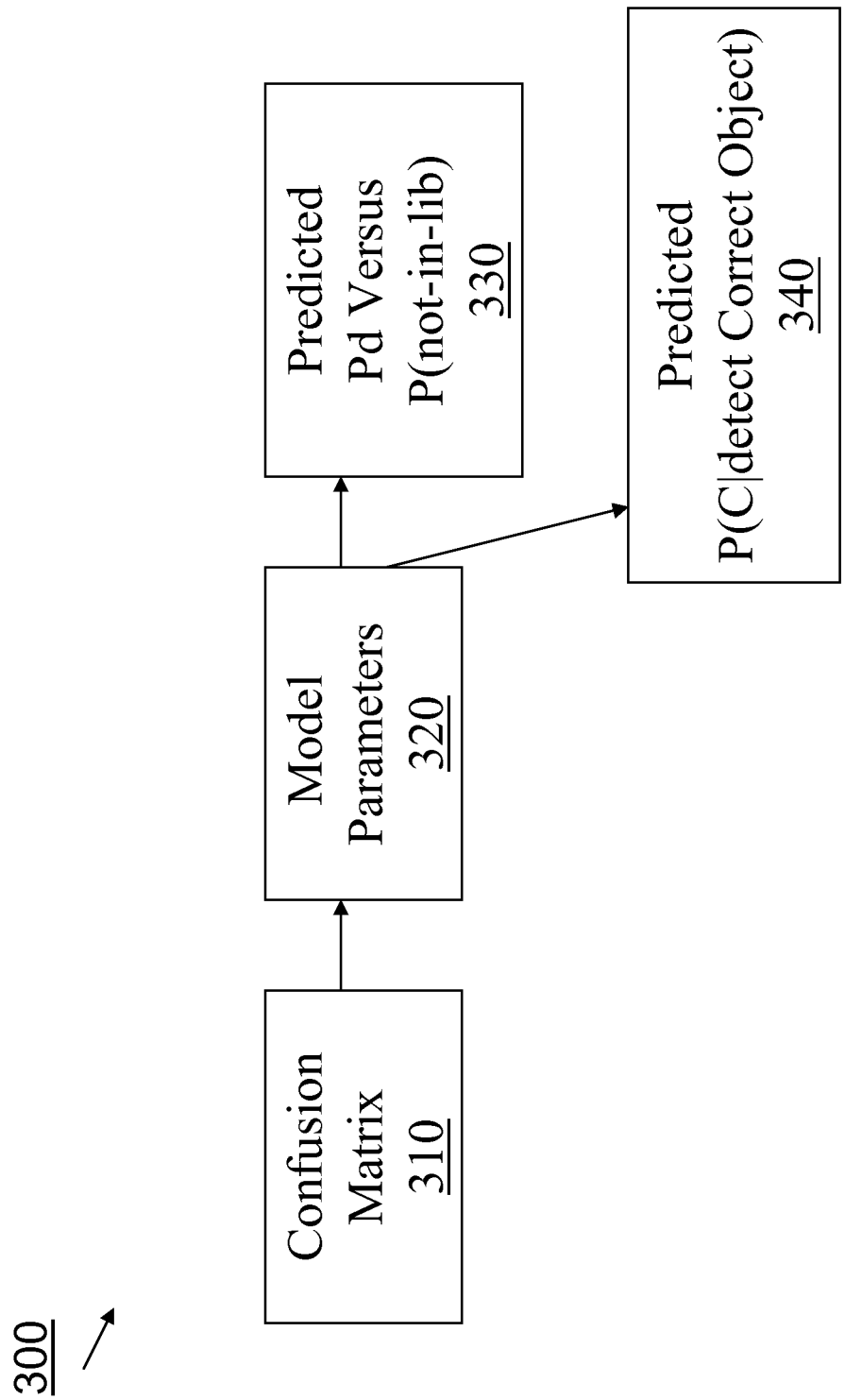
FIG. 3 shows a flow chart showing empirical modeling of the confusion matrices and confuser rejection predictions, according to an embodiment of this disclosure.

FIG. 3 shows a flow chart 300 showing empirical modeling of the confusion matrices and confuser rejection predictions, according to an embodiment of this disclosure. The modeling begins first an observed confusion matrix 310, which is fitted with model parameters 320, Depending on the predictions desired, forced predictions 330 or unforced predictions 340 may be made.

It has been observed that methods based on Rayleigh and Ricean statistics provide general approaches to modeling classification problems using quadrature detectors as disclosed, for example, in C. Helstrom, *Elements of Signal Detection and Estimation Prentice Hall*, 1995 and R. N. McDonough and A. D. Whalen, Detection of Signals in Noise, Academic Press, 1995, Ch. 7, and Gaussian-derived signals.

One example of a general class of problems where this type of error could arise is where one has the root sum of squares of two independent Gaussian differencing components for each class, where the correct target has 0 linear offset while the incorrect target has sum of squared offsets of $A^2$ over its two components. It has been suggested in C. Oliver and S. Quegan, *Understanding Synthetic Aperture Radar Images* Artech House, 1998, that the spectrum of a simplified model of a SAR target classification problem can be modeled as a sum of Gaussian squared error terms. A minimum root mean squared error classifier with two independent Gaussian "features" of equal variance will produce Rayleigh and Ricean density functions for $A=0$ for the correct class and non-zero mean ($A>0$) for the incorrect classes, so that a maximum likelihood criterion will select the least value of the root sum of squares.

The initial empirical model adopts this model with two Gaussian components to develop a model of confusion matrix performance, although it may be possible to subsequently extend this model to a higher number of terms if required. The Rayleigh density describes the observed root mean square error for the correct class and the Ricean density the same quantity for the incorrect class or classes.

Based on these densities, a simple empirical model may be applied to the modeling of observed confusion matrices which may in actual practice be derived from any type of underlying signals, allowing the free parameters of the model to fit the observed error probabilities within the rows of the confusion matrix. Letting the correct ($P_1$) likelihood function correspond to a Rayleigh density and the incorrect ($P_2$) likelihood correspond to a Ricean density, an expression for the probability of correct classification can be written as $$P_C = \int_0^\infty \frac{x}{\sigma_1^2} e^{\frac{-x^2}{2\sigma_1^2}} \int_x^\infty \frac{y}{\sigma_2^2} e^{\frac{-(y^2+A^2)}{2\sigma_2^2}} I_o\left(\frac{yA}{\sigma_2^2}\right) dy\, dx \qquad (1)$$

Where the event x<y corresponds to a correct classification (smaller values of the observed statistic z corresponding to higher likelihoods of the correct density versus the incorrect density), favoring the correct class (class one in this case). Extending this to M−1 independent identical incorrect classes gives $$P_C = \int_0^\infty \frac{x}{\sigma_1^2} e^{\frac{-x^2}{2\sigma_1^2}} \left( \int_x^\infty \frac{y}{\sigma_2^2} e^{\frac{-(y^2+A^2)}{2\sigma_2^2}} I_o\left(\frac{yA}{\sigma_2^2}\right) dy \right)^{M-1} dx \qquad (2)$$

The values of $\sigma_1$, $\sigma_2$, A and M in this equation determine the separability of the correct and M−1 incorrect classes.

Along the rows of measured confusion matrices, generally for each correct class there will be a distribution of scores of incorrect classes due to some incorrect classes being more similar, in terms of whatever features are used, to the correct class than others. This tends to vary with the row (corresponding to true class type) of the confusion matrix. The probability of correct classification based on the parameters of the model is sought to be described. For some classification problems it may be possible to reasonably assign a density to the noncentrality term A based on a model of the signals. This allows fitting of the $P_C$ model to actual confusion matrices where the probabilities of error for incorrect classes are not equal to each other. To account for this in the model, a Rayleigh density $$P_A(A) = P_A(A) = \frac{A}{A_0^2} e^{\frac{-A^2}{2A_0^2}}$$

was applied to the 'A' variable as this is a non-negative density that has $P_A(0)=0$ and can be made more or less dispersed using the parameter $A_0$. Other densities may be applied in cases where for particular classification problems the distribution of the noncentrality parameter is known a priori.

The expected value of the probability of correct classification for a two class problem, integrated over all values of A is $$P_C = \int_0^\infty \frac{x}{\sigma_1^2} e^{\frac{-x^2}{2\sigma_1^2}} \int_x^\infty \int_0^\infty \frac{A}{A_0^2} e^{\frac{-A^2}{2A_0^2}} \frac{y}{\sigma_2^2} e^{\frac{-(y^2+A^2)}{2\sigma_2^2}} I_o\left(\frac{yA}{\sigma_2^2}\right) dA\, dy\, dx. \qquad (3)$$

Exchanging the order of integration in the inner two integrals gives:

$$P_C = \int_0^\infty \frac{x}{\sigma_1^2} e^{\frac{-x^2}{2\sigma_1^2}} \int_0^\infty \frac{A}{A_0^2} e^{\frac{-A^2}{2A_0^2}} \int_x^\infty \frac{y}{\sigma_2^2} e^{\frac{-(y^2+A^2)}{2\sigma_2^2}} I_o\left(\frac{yA}{\sigma_2^2}\right) dy\, dA\, dx. \qquad (4)$$

which is the general expression for a two class forced decision mode probability of correct classification. The relationships between the three parameters $\sigma_1$, $\sigma_2$, and $A_0$ are such that the relative values of these parameters with respect to each other are important. There are only two actual degrees of freedom in the model (not yet counting the number of classes), and so without loss of generality each of the $\sigma_1$, $\sigma_2$, and $A_0$ parameters was scaled by $$\frac{1}{\sigma^2}$$

to obtain $$P_C = \int_0^\infty \frac{x}{\sigma_1^{\prime 2}} e^{\frac{-x^2}{2\sigma_1^{\prime 2}}} \int_0^\infty \frac{A}{A_0^{\prime 2}} e^{\frac{-A^2}{2A_0^{\prime 2}}} \int_x^\infty y e^{\frac{-(y^2+A^2)}{2\sigma_2^2}} I_o(yA) dy\, dA\, dx. \qquad (5)$$

The inner two integrals have a closed form solution as disclosed by McDonough and Whalen, mentioned above, of $$e^{\frac{-x^2}{2(A_0^2+1)}}$$

(dropping the primes). Substituting into (5) and integrating gives $$P_C = \frac{A_0^2 + 1}{A_0^2 + \sigma_1^2 + 1}. \qquad (6)$$

Treating the M−1 incorrect classes of the confusion matrix as statistically independent allows us to write the equation for the $P_C$ of an M independent class confusion matrix:

$$P_C = \int_0^\infty \frac{x}{\sigma_1^2} e^{\frac{-x^2}{2\sigma_1^2}} \left( \int_0^\infty \frac{A}{A_0^2} e^{\frac{-A^2}{2A_0^2}} \int_x^\infty y e^{\frac{-(y^2+A^2)}{2}} \cdot I_o(yA) dy\, dA \right)^{M-1} dx \qquad (7)$$

which integrates to $$P_C = \frac{A_0^2 + 1}{A_0^2 + (M-1)\sigma_1^2 + 1}. \qquad (8)$$

Next the unforced decision detection rates for both in-library and out-of-library target classes is derived. Whereas the in-library and out-of library forced decision rates are identically 1, the unforced decision method places an upper threshold $U_0$ on the observed statistic corresponding to the quality of the match of the measurement to the model. In the context of this model, the equation for unforced M class detection is (treating the correct and incorrect class densities as conditionally independent):

$$P_{d_{uf}}(U_0) = 1 - \left( \int_{U_0}^{\infty} \frac{x}{\sigma_1^2} e^{\frac{-x^2}{2\sigma_1^2}} dx \right) \cdot \left( \int_0^{\infty} \frac{A}{A_0^2} e^{\frac{-A^2}{2A_0^2}} \int_{U_0}^{\infty} xe^{\frac{-(x^2+A^2)}{2}} I_o(xA) dx dA \right)^{M-1} \quad (9)$$

which simplifies to $$P_{d_{uf}}(U_0) = 1 - e^{\frac{-u_0^2(\sigma_1^2(M-1)+A_0^2+1)}{2\sigma_1^2(A_0^2+1)}} \quad (10)$$

The ratio $$\frac{A_0}{\sigma_1}$$

is a natural signal to noise ratio that controls the relative detection and identification levels for any set value of M classes. Note that this ratio can vary for each row of a given confusion matrix.

The probability of reporting an out-of-library target using an unforced decision method makes an assumption, based on the expectation that a confuser should be, on the average, more difficult to detect than an in-library object, that the value of $A_{0c} \geq A_0$ of the in-library classes, where $A_{0c}$ refers to the effective value of the Rayleigh density parameter for the class of confuser objects. Note that this value has an implicit relationship to both the normalized $\sigma_2$, which is set to 1 in the model, and to the normalized $\sigma_1$ whenever a comparison is made to the probabilities of in-library and out-of-library detection. Corresponding to the ratio $$\frac{A_0}{\sigma_1}$$

is the ratio $$\frac{A_{0c}}{\sigma_1}$$

which is related to the probability of detection of a true target versus the confuser leakage probability P (Leak).

It may in some cases be possible to characterize the relative values of the $A_0$ and $A_{0c}$ parameters, which will depend on the actual classifier and the templates or models of the objects involved, assuming that representative confuser samples are available. In these cases, one can develop estimates of out-of-library confuser values of $A_{0c}$ to be able to more specifically characterize the likelihood of leakage rates of specific classes of objects. The model presented herein provides a formalism for such approaches which may also apply to other applications such as medical lesion classification that have classes of object types and associated confusion matrices and false alarm rates. The probability of leakage using the model is expressed as:

$$P_{L_{uf}}(U_0) = 1 - \left( \int_0^{\infty} \frac{A}{A_{0c}^2} e^{\frac{-A^2}{2A_{0c}^2}} \int_{U_0}^{\infty} xe^{\frac{-(x^2+A^2)}{2}} I_o(xA) dx dA \right)^M \quad (11)$$

$$= 1 - e^{\frac{-U_0^2 M}{2(A_{0c}^2+1)}}.$$

Letting $A_{0c}=A_0$ sets an upper bound on the leakage probability or P(Leak)=P(Report/not-in-library) as probability or $P(\text{Leak}) = P(\text{Report} | \text{not-in-library})$ as $\quad (12)$ $$= 1 - e^{\frac{-U_0^2 M}{2(A_0^2+1)}}$$

Combining 10 and 12 expresses the probability of detection in terms of the probability of leakage:

$$P_{d_{uf}} = 1 - (1 - P_{L_{uf}})^{\frac{(A_0^2+1)(\sigma_1^2(M-1)+A_0^2+1)}{M\sigma_1^2(A_0^2+1)}} \quad (13)$$

FIG. 4 shows plots of the $P_{d_{uf}}$ versus $P_{l_{uf}}$ for four different values of the parameter $A_{0c}$ at fixed $\sigma_1$ and M.

It is also of interest to obtain the unforced probability of correct classification given that the correct in-library target is detected. The joint probability of unforced classification and detection of the correct type may be written as $$P(C, d_c)_{uf}(U_0) = \int_0^{U_0} \frac{x}{\sigma_1^2} e^{\frac{-x^2}{2\sigma_1^2}} \cdot \left( \int_0^{\infty} \frac{A}{A_0^2} e^{\frac{-A^2}{2A_0^2}} \int_x^{\infty} ye^{\frac{-(y^2+A^2)}{2}} I_o(yA) dy dA \right)^{M-1} dx. \quad (14)$$

which gives $$P(C, D_c)_{uf}(U_0) = \frac{A_0^2 + 1}{A_0^2 + \sigma_1^2(M-1) + 1} \cdot \left(1 - e^{\frac{-U_0^2(\sigma_1^2(M-1)+A_0^2+1)}{2\sigma_1^2(A_0^2+1)}}\right) \quad (15)$$

Using $$P(C/D_c)uf(U_0) = \frac{P(C, D_c)uf(U_0)}{P_{D_{Cuf}}(U_0)}$$

allows for estimating the probability of a correct report given that a correct detection has occurred, where $$P_{D_{C_{uf}}}(U_0) = 1 - e^{\frac{-U_0^2}{2\sigma_1^2}} \quad (16)$$

FIG. 5 shows an example of joint identification and correct detection and conditional identification given correct detection versus P(Leak).

Note that the density $P_{AO}(A)$ does not imply that each incorrect class that is actually observed will behave equivalently; in fact that was expected, with respect to any in-library target that is actually observed, the incorrect in-library target class models will be associated with values of A that behave as if associated with approximately random samples of the A parameter. The confusion matrices that are obtained in practice will therefore show some incorrect in-library targets as if they were more similar to the test target than others, leading to a range of errors along the row of matrix associated with each in-library class. A two stage procedure was used to estimate the values of $A_0$ for either the average values of the confusion matrix or each row of the confusion matrix individually. To estimate the parameters $A_0$ and $\sigma_1$ equation 9 was used to obtain a set of iso-values of $A_0$ and $\sigma_1$ all of which give equivalent values of $P_C$. A sequential search based on a Monte Carlo method was then used to find the pair of $A_0$ and $\sigma_1$ values from the initial set of iso $A_0$ and $\sigma_1$ values that best (using a minimum squared error fit criteria) fit to the largest error term $P_{e1}$ along the row of an M class confusion matrix. The search proceeded over the inverse of discrete increments of the cumulative density of $P(A \backslash A_0)$ for each of the M−1 incorrect classes and calculated the error values associated with the '$A$'$_j$ values for each incorrect column 'j' of the mean confusion matrix.

As an example application of the model, results of the model predictions were compared to a reported leakage probability in the literature for a three class problem disclosed in Q. Zhao and J. Q. Principe, *Support Vector Machines for SAR Automatic Target Recognition*, IEEE Trans. on Aerospace and Electronic Systems, Vol. 37, No. 2, April 2001, 643-654, Table IV (Template Matching Confusion Matrix).

To fit to an observed confusion matrix, it may be possible to calculate the values of $A_{0i}$ for each row i of the three class confusion matrix, all at $\sigma_1$ values of 0.5. The respective $A_{0i}$ values were 1.2995, 3.6340 and 0.9326 for estimated $P_c$ values of 0.8423, 0.966 and 0.789. Since only the $P_C$ values at Pd=0.90 were reported it was assumed that those values in the last 10% of the samples, which were rejected at the detection stage, were random in terms of their classification. Using the respective values of $A_{0i}$ and $\sigma_1$, the inventor then averaged the predicted $P_{duf}$ values as a function of P(Leak) for the class of confusers which was assigned $A_{0c}=A_{0i}$ for each of the respect rows and row-based receive operating characteristic (ROC) calculations.

FIG. 6 shows the resulting averaged $P_{duf}$ which was obtained by averaging the respective $P_{dufi}$ values from the rows of the reported confusion matrix versus P(Leak) along with the reported leakage rate at the measured $P_{duf}$. At the experimentally reported P(Leak)=0.465 the model predicted a $P_{duf}$ value of 0.93, whereas the measured average $P_{duf}$ at this leakage rate was 0.918. Given the expected variability in the leakage rates when testing with randomly selected confusers, this may be an acceptable error (less than 2% prediction error) indicating utility of the model.

An empirical model of classifier performance is provided that is amenable to fitting to the $P_C$, $Pe_i$ and $P_d$ performance as represented in M class confusion matrices and its individual rows. The unforced probability of detection and conditional classification probability given correct target detection were presented. The parameters of the model then allow predictions regarding the expected probability of leakage P(Leak) based on a model of the effective signal to noise ratios of the incorrect targets and confuser targets to the correct targets. An example of the use of the method for modeling leakage performance was presented. The generality of the model also enables it to be used to fit to observed receiver operating characteristic curves from a variety of classification sources, with the parameters characterizing the target detectability versus different levels of clutter severity.

It will be appreciated that the embodiments disclosed herein, may be implemented through hardware, software (firmware), or combination thereof. For example, a suitable microprocessor may be configured for handling the various mathematical functions and operations.

While this disclosure has been described in connection with what is presently considered to be the most practical embodiments, it is to be understood that it is capable of further modifications and is not to be limited to the disclosed embodiment, and this application is intended to cover any variations, uses, equivalent arrangements or adaptations of this disclosure following, in general, the principles of the inventive concepts and including such departures from the present disclosure as come within known or customary practice in the art to which the disclosure pertains, and as may be applied to the features hereinbefore set forth and followed in the spirit and scope of the appended claims.

What is claimed is:

1. A computer-implemented method for estimating the performance of a classifier system, comprising:
   providing an observed confusion matrix quantified by in-library category data which characterizes the classifier system as an input to a computer;
   generating, using the computer, an empirical model for the performance of the confusion matrix using two density functions that capture correct and incorrect performance of the in-library categories and their respective parameters, and a further density function characterizing an in-library to out-of-library probability parameter;
   predicting, based upon the empirical model, how well the classifier system will perform when presented with out-of-library data; and
   outputting, from the computer, the prediction to estimate the performance of the classifier system.

2. The method according to claim 1, wherein at least one of the two density functions comprises a Gaussian-derived function.

3. The method according to claim 2, wherein the Gaussian-derived function comprises a Rayleigh density function.

4. The method according to claim 2, wherein the Gaussian-derived function comprises a Ricean density function.

5. The method according to claim 1, wherein the further density function comprises a non-centrality term of a Rayleigh density function.

6. The method according to claim 1, further comprising:
   predicting how well the classifier system will perform when presented with detected data from non-library categories.

7. A system for estimating the performance of a classifier system, comprising:
   a computer processor;

a memory containing a structured database having an observed confusion matrix quantified by in-library category data which characterizes the classifier system;

an empirical modeler configured to generate an empirical model of the classifier performance using two density functions that capture correct and incorrect performance of the in-library categories and their respective parameters from the confusion matrix, and a further density function characterizing an in-library to out-of-library probability parameter;

a predictions unit configured to predict, based upon the empirical model, how well the classifier system will perform when presented with out-of-library data; and a device configured to output the prediction to estimate the performance of the classifier system.

8. The system according to claim 7, wherein at least one of the two density functions comprises a Gaussian-derived function.

9. The system according to claim 8, wherein the Gaussian-derived function comprises a Rayleigh density function.

10. The system according to claim 8, wherein the Gaussian-derived function comprises a Ricean density function.

11. The system according to claim 7, wherein the further density function comprises a non-centrality term of a Rayleigh density function.

12. The system according to claim 8, wherein the predictions unit is further configured to predict how well the classifier system will perform when presented with detected data from non-library categories.

* * * * *

UNITED STATES PATENT AND TRADEMARK OFFICE
CERTIFICATE OF CORRECTION

PATENT NO. : 8,438,128 B2
APPLICATION NO. : 12/604539
DATED : May 7, 2013
INVENTOR(S) : David M. Doria It is certified that error appears in the above-identified patent and that said Letters Patent is hereby corrected as shown below:

On the Title page, in column 2, under "Other Publications", line 1, after "D.M.", insert --,--, therefor On the Title page, in column 2, under "Other Publications", line 3, delete "Software) ;", insert --Software);--, therefor On the Title page, in column 2, under "Other Publications", line 4, after "5074698", insert --,--, therefor On the Title page, in column 2, under "Other Publications", line 5, delete "2008 ," and insert --2008,--, therefor On the Title page, in column 2, under "Other Publications", line 9, delete "Broadcasting ;" and insert --Broadcasting;--, therefor On the Title page, in column 2, under "Other Publications", line 15, delete "2d" and insert --2nd--, therefor On the Title page, in column 2, under "Other Publications", line 19, delete "IEE" and insert --IEEE--, therefor In the Specification In column 2, line 58, after "may", insert --be--, therefor In column 3, line 10, delete "confusing" and insert --using--, therefor In column 3, line 40-41, delete "measurements", and insert --measurement--, therefor Signed and Sealed this
First Day of October, 2013

Teresa Stanek Rea
*Deputy Director of the United States Patent and Trademark Office*

CERTIFICATE OF CORRECTION (continued)
U.S. Pat. No. 8,438,128 B2

In column 3, line 41, delete "be used", insert --use--, therefor

In column 3, line 66, Delete "(PD)" and insert --($P_d$)--, therefor

In column 3, line 67, delete "($P_{leak}$)" and insert --($P_{Leak}$)--, therefor In column 4, line 33, after "first", insert --at--, therefor In column 4, line 34, delete "320,", insert --320.--, therefor In column 4, line 51, after "Images", insert --,--, therefor In column 4, line 66, after "density", insert --of--, therefor In column 8, line 38, delete "$P_{luf}$" and insert --$P_{Luf}$--, therefor In column 8, equi. 14, delete "$P(C, d_c)_{uf}$" and insert --$P(C, D_c)_{uf}$--, therefor In column 8, line 65 (Approx.), delete "$P(C|D_c)uf$" and insert --$P(C|D_c)_{uf}$--, therefor In column 8, line 65 (Approx.), delete "$P(C,D_c)uf$" and insert --$P(C,D_c)_{uf}$--, therefor In column 9, line 56, delete "respect", insert --respective--, therefor In column 9, line 59, delete "$P_{dufi}$" and insert --$P_{duf}$,--, therefor